June 18, 1957   C. O. MALLINCKRODT   2,796,463
COMPOSITE CONDUCTORS
Filed June 29, 1951

(MAY BE METAL OR DIELECTRIC)

INVENTOR
C. O. MALLINCKRODT
BY
Hugh S. Wertz
ATTORNEY

United States Patent Office 2,796,463
Patented June 18, 1957

2,796,463

COMPOSITE CONDUCTORS

Charles O. Mallinckrodt, Summit, N. J., assignor to Bell Telephone Laboratories, Incorporated, New York, N. Y., a corporation of New York Application June 29, 1951, Serial No. 234,260

3 Claims. (Cl. 178—45)

This invention relates to electrical conductors and more particularly to composite conductors formed of a multiplicity of insulated conducting portions.

It is an object of this invention to improve the current distribution in conductors of the type comprising a large number of insulated conducting portions.

In a copending application of A. M. Clogston, Serial No. 214,393, filed March 7, 1951, which issued on October 30, 1956 as United States Patent 2,769,148, there are disclosed a number of composite conductors each of which comprises a multiplicity of insulated conducting elements of such number, dimensions and disposition relative to each other and the orientation of the electromagnetic wave being propagated therein as to achieve a more favorable distribution of current and field within the conducting material. In one specific embodiment disclosed in the Clogston application, a plurality of coaxially arranged composite conductors are separated by a dielectric material, each of the composite conductors comprising a multiplicity of thin metal laminations insulated from one another by layers of insulating material, the smallest dimension of the laminations being in the direction perpendicular to both the direction of wave propagation and the magnetic vector. Each metal lamination is many times (for example, 10, 100, or even 1,000 times) smaller than a factor $\delta$ which is called one skin thickness or one skin depth. The distance $\delta$ is given by the expression:

$$\delta = \sqrt{\frac{1}{\pi f \mu \sigma}} \qquad (1)$$

where $\delta$ is expressed in meters, $f$ is the frequency in cycles per second, $\mu$ is the permeability of the metal in henries per meter, and $\sigma$ is the conductivity in mohs per meter. The factor $\delta$ measures the distance in which the current or field penetrating into a slab of the metal many times $\delta$ in thickness will decrease by 1 neper; i. e., their amplitude will become equal to $$\frac{1}{e} = 0.3679$$

... times their amplitude at the surface of the slab.

It was pointed out in the Clogston application that when a conductor has such a laminated structure, a wave propagating along the conductor at a velocity in the neighborhood of a certain critical value will penetrate further into the conductor (or completely through it) than it would penetrate into a solid conductor of the same material, resulting in a more uniform current distribution in the laminated conductor and consequently lower losses. The critical velocity for the type of structure just described is determined by the thickness of the metal and insulating laminae and the dielectric constants of the insulation between the laminae in the composite conductors and of the dielectric material between the two composite conductors. The critical velocity can be maintained by making the dielectric constant of the main dielectric, i. e., the dielectric material between the two composite conductors, equal to:

$$\epsilon_1 = \epsilon_2 \left(1 + \frac{W}{t}\right) \qquad (2)$$

where $\epsilon_1$ is the dielectric constant of the main dielectric element between the two composite conductors in farads per meter, $\epsilon_2$ is the dielectric constant of the insulating material between the laminae of the conductors in farads per meter, $W$ is the thickness of one of the metal laminae in meters, and $t$ is the thickness of an insulating layer in meters. The insulating layers are also made very thin and an optimum thickness for certain structures of this general type is that in which each insulating layer is one-half of the thickness of a metal lamina. It can be seen that Equation 2 equates the dielectric constant of the main dielectric element to the average transverse dielectric constant of the laminated or composite structure. In the aforementioned copending Clogston application it is pointed out that velocity of propagation of electromagnetic waves is proportional to $$\frac{1}{\sqrt{\mu \epsilon}}$$

In the case of two adjacent media, if the product of $\mu \epsilon$ in one medium is equal to the product of $\mu \epsilon$ in the other medium, the velocity of propagation, all else being equal, will be the same for the two media. Therefore there will be a substantially uniform velocity of propagation throughout the cross-section of the area defined by the two adjacent media.

The present invention relates to an improvement in composite structures of the type just described and also other related structures, such as, for example, others described in the above-mentioned Clogston application. When the wave velocity of propagation is controlled in one of these structures by the use of dielectric material, the impedance of the system is decreased, and the conductor losses are greater than they would be if this decrease in impedance had not been necessary. In the present invention, the effect of this impedance decrease is alleviated.

It is another object of this invention to improve the transmission characteristics and other requirements of composite structures of the types of those disclosed in the above-mentioned Clogston application.

Before describing the features of novelty of the present invention it seems advisable to consider certain theoretical factors. The power loss in the conductor, such as the central wire of a coaxial cable, is minimum when the current density within the conductor is uniform. When the current propagated along a coaxial cable is direct current, its distribution is determined essentially by the resistance of the material, and with a homogeneous material such as copper the distribution will be uniform. When the current is an alternating one, its distribution depends not only upon the resistance of the material but also upon the E. M. F.'s set up by the alternating magnetic field. These E. M. F.'s tend to force the current to the surface of the conductor, and this effect increases as the frequency is increased. This results in an increase in alternating current resistance and leads to substantially higher attenuation. There is the further disadvantage that the attenuation varies with frequency. Once the frequency is high enough so that a well-developed skin effect is present, with further increase in frequency the attenuation due to conductor losses tends to increase proportional to the square root of the frequency. If a non-magnetic material of high resistivity is used in place of copper, the current density is more nearly uniform because the effect of the resistance tends to predominate over the effect of the E. M. F.'s induced by the alternating magnetic field. However, the attenuation is higher due to the increase in alternating current resistance. Another way of obtaining a more nearly uniform current distribution, and this is the way used in the present invention, is to utilize elements which have a high reactive component of impedance. An advantage of this arrangement is that the reactance absorbs no power. The power loss then is only in the resistance component of the impedance which is present to some degree in any physically realizable material.

In accordance with the invention, transverse cuts are introduced in each conducting lamina at periodic intervals in the direction of transmission, these cuts being closely spaced such as, for example at intervals less than a quarter wavelength of the highest frequency the conductor is adapted to propagate. In each conducting lamina the cuts are staggered relative to those in adjacent laminae by an amount equal to half the spacing between successive cuts. This introduces a reactive (capacitive) impedance which does not introduce any new power loss and which improves the current distribution in the composite conductor. This structure is also more tolerant to accidental conducting paths between adjacent conducting laminae than is the specific Clogston structure described in detail above. It also makes possible more lenient electrical requirements which permit thinner insulating laminae, thereby improving the transmission characteristics of the composite conductor. Over a useful but restricted range of frequencies, the depth of penetration is less critically dependent upon the value of dielectric constant of the main dielectric given above in Equation 2 and, furthermore, this restricted frequency band is substantially increased by loading the line magnetically. A convenient way of magnetic loading is by inserting one or more magnetic cylinders or tapes in the central dielectric member.

While for convenience the invention will be described below in connection with a coaxial structure of two composite conductors each made up of a multiplicity of metal laminae insulated from one another and the two composite conductors are separated by a central dielectric member, it will be obvious that the invention is not limited to this structure since certain principles thereof apply as well to other structures of the general types disclosed in the above-mentioned Clogston application.

The invention will be more readily understood by referring to the following description taken in connection with the accompanying drawing forming a part thereof, in which.

Figure 1:
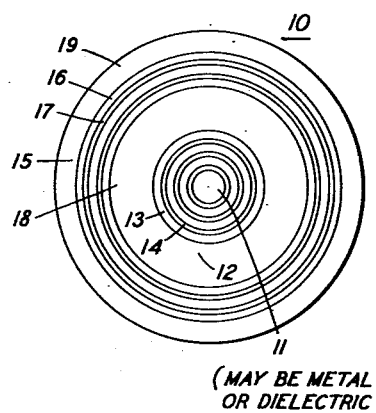
Fig. 1 is an end view of a coaxial transmission line in accordance with the invention, each of the inner and outer conductors of the line comprising a multiplicity of metal laminations insulated from one another and the two conductors being separated by dielectric material.
Figure 2:
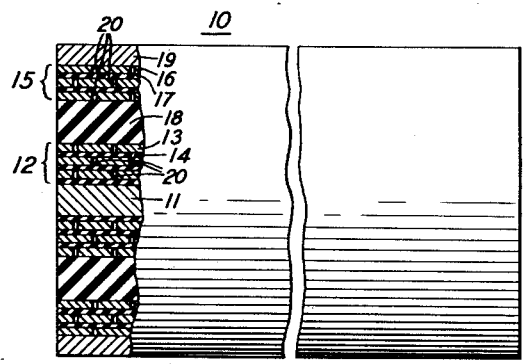
Fig. 2 is a longitudinal view, with portions thereof in section, of the embodiment shown in Fig. 1, this view showing the transverse cuts in the conducting laminae.

Referring more particularly to the drawing, Figs. 1 and 2 show, by way of example for purposes of illustration, a conductor 10 in accordance with the invention, Fig. 1 being an end view and Fig. 2 being a longitudinal view. The conductor 10 comprises a central core 11 (which may be either of metal or dielectric material), an inner conductor 12 formed of many laminations of metal 13 spaced by insulating material 14, an outer conductor 15 formed of a multiplicity of layers of metal 16 spaced by insulating material 17 and separated from the inner conductor 12 by a dielectric member 18, and an outer sheath 19 of metal or other suitable shielding material. As disclosed in the above-mentioned Clogston application, the metal layers 13 and 16 are very thin compared to the skin depth of the conductor being used which, for example, can be copper, silver or aluminum. The insulating layers 14 and 17 are also made very thin and may be of any suitable material. Preferably they are of the order of one-half the thickness of each metal layer although this is not necessarily true in all cases. The inner conductor has 10 or 100 or more metal layers 13 and the outer conductor 15 has a somewhat similar number of metallic layers 16 though there need not be exactly the same number as in the inner conductor 12. Since there are a large number of insulating and metallic layers, it makes no difference whether the first or the last layer in each stack (12 or 15) is of metal or of insulation.

For a wide band of frequencies, the dielectric material 18 is preferably chosen so that the velocity of propagation of a wave going down the length of the conductor has the proper value to give minimum attenuation, as set forth in the above-identified Clogston application although this value is not as critical as in the corresponding structure in the latter application. Equation 2 given above sets forth the relationship between $\epsilon_1$ which is the dielectric constant of the member 18 and $\epsilon_2$ which is the dielectric constant of the insulating material 14 and 17 in terms of the thickness W of the middle laminae and of the thickness $t$ of the insulating material. However, for restricted lower ranges of frequencies, the value $\epsilon_1$ is not critical in the present invention and, as set forth below, this range can be extended by magnetic loading.

Figure 3:
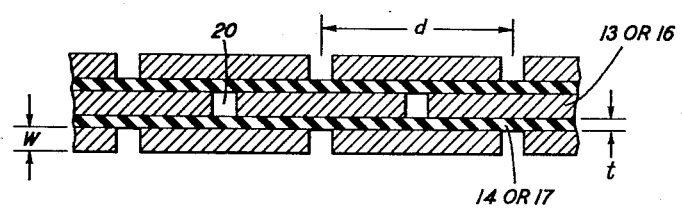
Fig. 3 is a partial longitudinal view, drawn to a greatly enlarged scale, of a portion of Fig. 2.
Figure 4:
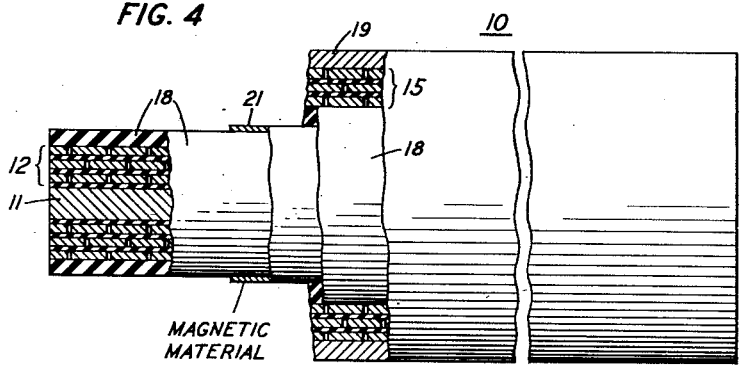
Fig. 4 is a longitudinal view, with portions broken away and with other portions in section, of a modification of the embodiments of Figs. 1 and 2, the former differing from the latter in that magnetic loading is used.

In accordance with the present invention, a multiplicity of transverse cuts 20 are made in the metal layers 13 and 16, as shown in greater detail in Fig. 3 which is an enlarged cross-sectional view of a small portion of the conductor 12 or of the conductor 15. Preferably these cuts 20 are closely spaced such as for example at an interval $d$ which may be less than a quarter wavelength of the highest frequency the conductor is adapted to propagate. The width of the cuts is not critical and they extend completely through the conducting layers. In each conducting lamina 13 or 16, the cuts 20 are staggered relative to those in adjacent conducting laminae by an amount equal to half the space between successive cuts in order to give complete alternating current transmission paths down the conductor. The effect of the arrangement using such transverse cuts is to introduce a reactive (capacitive) impedance which improves the current distribution in the conductor. As pointed out above, such an arrangement is more tolerant to accidental conducting paths (short circuits) between adjacent conducting laminae 13 or 16 than is the corresponding Clogston structure which does not have the transverse cuts 20 because a smaller portion of the conductor is affected. It also makes possible more lenient electrical requirements which permit thinner insulating laminae 14 or 17, thereby improving the transmission characteristics of the composite conductor 10. Over a useful but restricted range of frequencies, the depth of penetration of the wave being propagated down the length of the conductor is less critically dependent upon the value of the dielectric constant $\epsilon_1$ of the central dielectric 18 given above in Equation 2. Even this restricted frequency band can be substantially increased by loading the line magnetically. Any suitable way of magnetically loading a line of the type shown in Figs. 1 and 2 (but without the cuts 20) disclosed in the copending application of J. G. Kreer, Jr., Serial No. 234,358, filed June 29, 1951, which issued on April 3, 1956, as United States Patent No. 2,740,834, may be used for this purpose. By way of example, Fig. 4 shows one method of magnetically loading a composite conductor of the type shown in Figs. 1 and 2. The arrangement of Fig. 4 differs from that disclosed in Figs. 1 and 2 only in that the dielectric member 18 has one or more magnetic cylinders or tapes 21 positioned therein.

It is obvious that the invention is not restricted to the specific form of composite conductor shown as the invention is equally applicable to a case where the dielectric member 18 is replaced by a multiplicity of laminated insulated conductors like those in composite conductors 12 and 15 and also to a case where filaments are used in place of laminations, both of which modifications (but without periodic cuts 20 as in the present invention) are disclosed in the first-mentioned Clogston application. Obviously other modifications can be made in the embodiments described above without departing from the scope of the invention as indicated in the claims.

What is claimed is:

1. A composite elongated electromagnetic wave conductor adapted for use with high frequency electromagnetic waves comprising a multiplicity of elongated concentric conducting layers spaced by means including insulating material, there being a sufficient number of conducting layers to carry a substantial portion of the current in said conductor and each of said conducting layers having at least one dimension in a direction substantially transverse to the direction of wave propagation down the length thereof which is small compared with its appropriate skin depth at the highest frequency of operation with said high frequency waves, said layers being arranged in two groups separated from one another by a larger distance than the spacing between any two of the conducting layers within a group, dielectric material in the space between the two groups, each of said elongated conducting layers comprising a plurality of longitudinally spaced hollow cylindrical members of conducting material, the members in adjacent layers being offset from one another to form a multiplicity of capacitances extending longitudinally and transversely of each of said groups, said insulating material and dielectric material being so chosen and the value of the capacitances being such as to cause the current in each of said groups to be substantially uniformly distributed throughout the group.

2. A composite wave conductor as in claim 1 in which the space between the two groups includes magnetic material.

3. In an electromagnetic wave guiding system, a composite conductor comprising a multiplicity of concentric conducting layers spaced by means including insulating material, and means for launching high frequency electromagnetic waves in said system, there being a sufficient number of conducting layers to carry a substantial portion of the current induced by said waves, each of said conducting layers having at least one dimension in a direction substantially transverse to the direction of wave propagation down the length thereof which is small compared with its appropriate skin depth at the highest frequency of operation with said high frequency waves, and each of said conducting layers being cut at regular intervals into a number of spaced cylindrical sections lengthwise of the composite conductor, each of said cylindrical sections being less than a quarter wavelength long at the highest frequency of operation, the sections in adjacent spaced conducting layers being offset to form a multiplicity of capacitances extending longitudinally and transversely of said conductor whereby the said composite conductor is substantially penetrated by the electric field of said waves.

References Cited in the file of this patent

UNITED STATES PATENTS

| | | |
|---|---|---|
| 248,742 | Henck | Oct. 25, 1881 |
| 1,701,278 | Silbermann | Feb. 5, 1929 |
| 1,855,303 | McCurdy | Apr. 26, 1932 |
| 1,996,186 | Affel | Apr. 2, 1935 |
| 2,008,286 | Leib | July 16, 1935 |
| 2,228,798 | Wasserman | Jan. 14, 1941 |

FOREIGN PATENTS

| | | |
|---|---|---|
| 458,505 | Great Britain | Dec. 17, 1936 |